ENDLESS TAPE RECORDER-TRANSCRIBER DICTATION SYSTEM CONTROL

Filed June 8, 1970

4 Sheets-Sheet 1

WILLIAM M. NYE
STANLEY W. JONES
INVENTORS

BY Seed, Berry & Dowrey
ATTORNEYS

ENDLESS TAPE RECORDER-TRANSCRIBER DICTATION SYSTEM CONTROL

Filed June 8, 1970 4 Sheets-Sheet 2

INVENTORS
WILLIAM M. NYE
STANLEY W. JONES
BY
ATTORNEYS

ENDLESS TAPE RECORDER-TRANSCRIBER DICTATION SYSTEM CONTROL

Filed June 8, 1970

INVENTORS
WILLIAM M. NYE
STANLEY W. JONES
BY
Seed, Berry & Dowrey
ATTORNEYS

INVENTORS
WILLIAM M. NYE
STANLEY W. JONES
BY
Seed, Berry & Downey
ATTORNEYS 3,712,961

ENDLESS TAPE RECORDER-TRANSCRIBER DICTATION SYSTEM CONTROL

William M. Nye, Bellevue, and Stanley W. Jones, Seattle, Wash., assignors to Lanier Electronic Laboratory, Inc., Atlanta, Ga.

Filed June 8, 1970, Ser. No. 44,390
Int. Cl. G11b *19/00;* H04m *11/10*
U.S. Cl. 179—100.1 DR 18 Claims

ABSTRACT OF THE DISCLOSURE

A remote dictation station is connected to a recorder-transcriber by two conductors which carry audio signals and control signals in the seize, dictate, reverse or listen modes between the dictation station and the recorder-transcriber. The polarity of the two conductors is reversed after receiving an initial signal from the dictation station that a user wishes to seize an available recorder-transcriber. A voltage comparator responsive to resistance changes in the dictate station initiator signals to operate the various functional modes of the recorder-transcriber. The seize signal from the voltage comparator is of a a value between dictate and listen signal value.

This invention relates to business dictating systems of the type employing an endless tape recording-transcribing machine and remote dictating and transcribing stations. More particularly, this invention relates to electronic control circuitry for operating such a system. Recording-transcribing systems of the type to which the present invention is specifically directed are described in U.S. Pat. Nos. 2,988,604 and 2,989,594.

The recorder-transcriber employed in these systems is a continuous flow tape recorder-playback unit designed for complete remote control, both from a dictate station and from a transcribe station. The recorder-transcriber comprises one or more tape holding bins designed to hold loosely-folded sections of an endless magnetic recording tape several hundred feet in length, a tape transporting mechanism designed to move sections of the tape past recording and reproducing heads in response to control signals received from dictate and transcribe stations, and appropriate electrical or electronic circuitry necessary for operating the tape transport mechanism, and for recording information on and reproducing information from the tape. The recorder-transcriber has five modes of operation: a "dictate forward" mode wherein an unrecorded-upon section of the tape is drawn across a tape head by the dictator as information is being recorded on the tape (previously-recorded information being first erased from the tape), a "listen forward" mode wherein a recorded-upon section of the tape is drawn across a tape head by the dictator as previously-recorded information is being played back to the dictator (the tape having been first backed-up without being erased); a "dictate reverse" mode wherein a section of the tape, containing previously-recorded information, is backed-up by the dictator preparatory to the dictator either playing back the previously-recorded information or recording over the previously-recorded information; a "transcribed forward" mode wherein the recorded-upon section of the tape is drawn across a tape head by the transcriber as previously-recorded information is played back to the transcriber; and a "transcribe reverse" mode wherein the first section of the tape is backed up by the transcriber preparatory to re-listening to the previously-recorded information.

The circuitry and tape transport mechanism of the recorder-transcriber are designed to permit the dictator and transcriber to simultaneously operate the recorder-transcriber in the performance of their respective functions of dictating, transcribing, tape reversal and playback. This circuitry includes a power supply, an electric motor coupled to the tape transport mechanism to move the endless tape in the various required directions, an erase-bias oscillator to erase the tape just prior to the recording of information and to provide a bias signal to the record head during the dictate forward mode, a dictate record amplifier to convert dictation into recordable signals during the dictate forward mode, dictate listen amplifier to re-convert recorded signals back to their original form during the listen forward mode when the dictator desires to playback dictation, and a secretary listen amplifier to re-convert recorded signals back to their original form during the transcribe forward and reverse modes. The circuitry also includes control circuits to actuate and deactuate the above-noted circuits and to cause tape movement in the directions necessary to the operation of the recorder-transcriber in its various modes.

The dictate station comprises circuitry designed to activate the recorder-transcriber preparatory to dictation, and to cause the recorder-transcriber to operate in the dictate forward, listen forward and reverse modes. To this end, the dictate station includes manual switches operable to permit the dictator to "dictate," "reverse" the tape, and to "listen" to a playback of previously recorded dictation.

Commonly, more than one dictate station is connected to one recorder-transcriber. Therefore, each dictate station should provide a visual indication as to whether the recorder-transcriber has been "seized" by another dictate station and is unavailable for recording. For such an installation, the recorder-transcriber and the dictate stations must be designed to prevent more than one dictate station from seizing the recorder-transcriber at a time.

In order to provide the required audio, control and signalling coupling between the dictate station and the recorder-transcriber, commercially-available systems have divided the various functions among four, five, six and eight wire interconnecting cables, with four and five wire cables predominating at the present time. These multiple wire cables often complicate installation where existing wires must be utilized or where a number of dictate stations are wired into a group of recorder-transcribers through a common trunk line. In the latter instance, cross-talk can occur between adjacent audio wires in the trunk line and severely disrupt the operation of the system. Thus far, however, the prior art has been limited in its ability to provide the necessary functional coupling between the dictate station and the recorder-transcriber by several factors. Firstly, a reduction in the number of interconnecting wires necessarily requires that each of the remaining wires combine several of the required functional couplings. Secondly, a reduction in the number of interconnecting wires requires combining audio coupling with control and signal coupling thereby affecting the rapidity at which the recorder-transcriber can be switched from one operational mode to the other because of the inherent resistance to that type of change imposed by the capacitative coupling in the audio circuits. Thirdly, the reduction in the number of interconnecting wires to the extent possible with the present invention heretofore would have necessitated the elimination of one or more of the capabilities of the system, such as the elimination of the dictate stations ability to visually indicate that the recorder-transcriber has been seized by another dictate station and is unavailable.

A primary object of the present invention is to provide a more sophisticated control circuitry of a remote, endless tape recording-transcribing system of the type illustrated by U.S. Pats. Nos. 2,988,604 and 2,989,594. A more specific object is to provide novel dictate station and recorder-transcriber circuitry enabling the use of a two-wire interconnecting cable. Another object is to provide novel dictate station and recorder-transcriber circuitry providing for balanced audio transmission between the dictate station and recorder-transcriber. A further object is to provide a novel control circuitry for a recorder-transcriber. These and other objects and advantages will become apparent from the following description of the invention and the accompanying drawings, of which:

In brief, the present invention comprises an electronic control circuit for a remote, endless tape recording-transcribing system. The drawings illustrate the application of the invention to a recorder-transcriber machine having an endless tape transport mechanism that is adapted to draw sections of the endless tape in dictate forward, listen forward, dictate reverse, transcribe forward, or transcribe reverse directions by the selective activation of a dictate forward solenoid or a dictate reverse solenoid or a transcribe forward solenoid or a transcribe reverse solenoid. Each of the solenoids are mechanically linked to a roller such that activation of any solenoid will cause the associated roller to engage a section of the endless tape against a continuously rotating capstan thereby causing that tape section to be drawn through the tape transport mechanism in the desired direction. As will become more apparent subsequently in this description, aspects of the invention are also applicable to recorder-transcribers of the type having tape transport mechanisms that employ one tape driving device for dictate forward and reverse modes and another tape driving device for transcribe forward and reverse modes.

The dictate station and recorder-transcriber of the present invention are provided with coupling circuitry, interconnected by a two wire cable, whereby two wires transmit power, audio and all control signals to and from the recorder-transcriber to the dictate station. In the preferred form of the invention, both wires transmit audio to and from the recorder-transcriber in a balanced manner such that any extraneous signals (including "cross talk") are unable to interfere with the proper reception of these audio signals. In the preferred form of the invention, the attempt by a dictate station to seize an available recorder-transcriber will cause a polarity reversal in the interconnecting cable which will trigger completion of a circuit to the control and audio sections of the dictate station, will cause the dictate station to seize that recorder-transcriber, will impose a condition at the dictate station input to the recorder-transcriber that will prevent a second dictate station (connected in parallel with the seized dictate station to the recorder-transcriber) from seizing that recorder-transcriber and will also cause the second dictate station to visually indicate that the recorder-transcriber is unavailable until the seized dictate station releases that recorder-transcriber. Once the recorder-transcriber is seized by a dictate station, actuation of the dictating control functions (such as "dictate," "reverse" or "listen") will create conditions within the recorder-transcriber that will trigger the actuation of the various control circuits to accomplish the desired functions.

Figure 1:
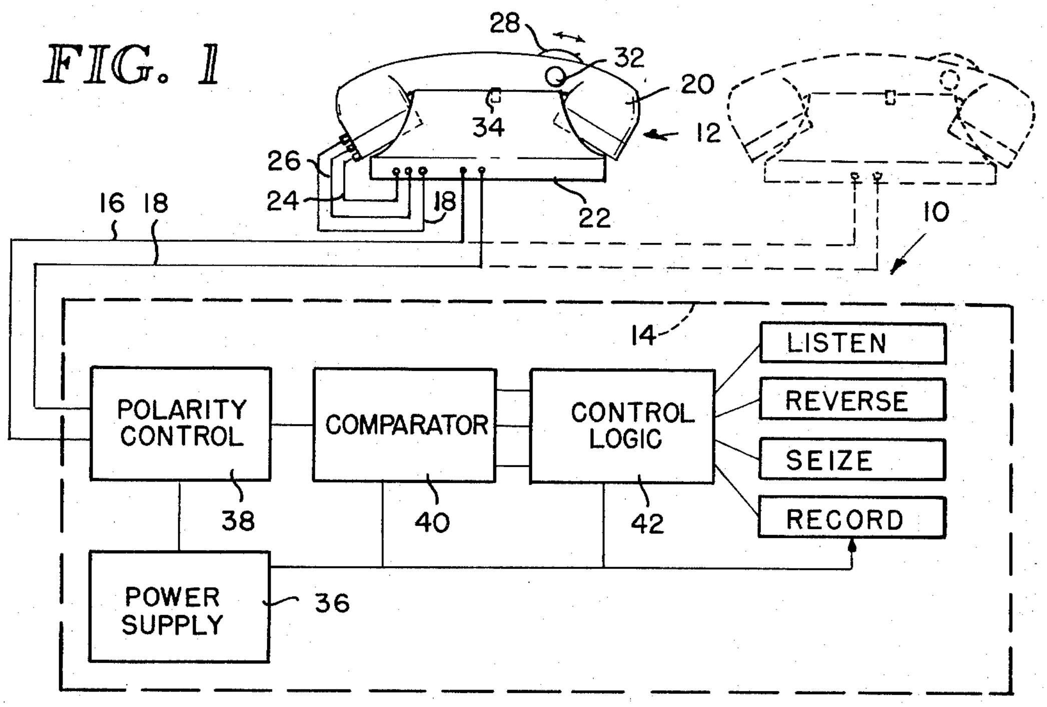
FIG. 1 is a block diagram of the two line dictation control system of the present invention.

Now with reference to the figures, a recording and reproducing system 10 is shown in FIG. 1 incorporating the two line dictation control system of the present invention and includes at least one dictate station 12 connected to a recorder-transcriber 14 by a cable containing only two conductors 16 and 18. These conductors carry both audio signals and control signals between the dictate station and the recorder-transcriber.

The dictate station 12 includes a handset 20 which rests upon a base 22 and is electrically connected thereto by lines 18, 24 and 26. The handset is provided with mode selection buttons which include a reverse and listen button 28 moveable in one direction for reverse and the opposite for listen, and a dictate button 32, while the base includes a hook switch operating button 34 which is depressed when the handset is at rest on the base.

The recorder 14 includes a power supply 36 which normally provides the system with a positive ground and a negative 24 v. operating voltage. However, the basic polarity of the system can be either positive or negative, depending upon the equipment design. The power supply 36 is coupled to the dictate station 12 through a polarity control unit 38 which controls the polarity of the conductors 16 and 18 to permit the dictate station to seize an available recorder. A comparator circuit 40 is responsive to impedance changes in the conductors 16 and 18 after a recorder is seized by the dictate station and operates in response to such impedance changes to provide control signals through logic circuitry 42 to first seize the recorder and then to place the recorder into dictate listen, dictate reverse, or dictate record as desired.

When the handset 20 is resting on the base 22, the button 34 is depressed holding the hook switch arm 52 on contact 54. At this time, with the recorder 14 turned on (i.e. external power applied to power supply 36) but not seized, the polarity control section 38 provides a positive ground to conductor 16 and a —24 v. to conductor 18 and a circuit is completed from conductor 18 through a diode D1 to a flag meter F and a resistor R1 to conductor 16. The resistance value of R1 is relatively high such that only enough current is drawn to cause the flag meter F to indicate that the recorder is turned on and available.

Figure 4:
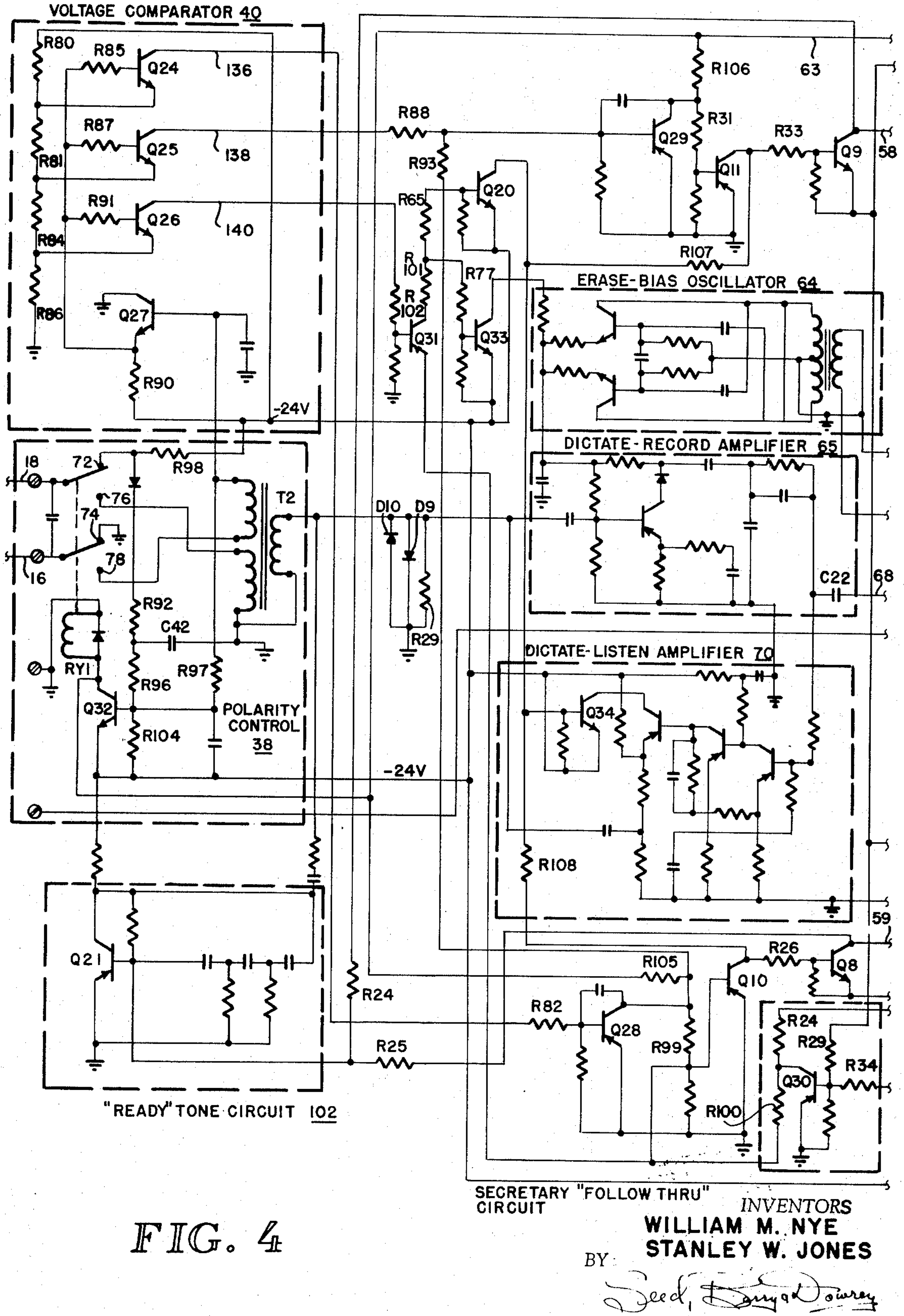
FIGS. 4, 5 and 6 are a schematic circuit diagram of a recorder-transcriber embodying the principles of the invention.

To seize the recorder, the handset is lifted from the base 22 causing the button 34 to move the hook switch 52 to contact 56 as shown. A circuit is now completed around resistance R1 and flag meter F through conductor 18 and diode D1 to a parallel circuit comprising resistance R2 and hook switch contact 56 to conductor 16. Resistance R2 has a relatively low value and draws enough current to impose a predetermined greater load at the dictate station input to the recorder to cause the recorder to seize. This greater current, drawn through conductor 18 and contact 72 (FIG. 4) of a relay operated double pole-double throw polarity reversal switch RY1, increases the voltage drop across a parallel circuit comprising resistances R104, R96 and R92 in one leg and resistance R98 in the other leg, the increased voltage drop in the first leg being sufficient to make the base of transistor Q32 sufficiently positive with respect to its emitter to cause Q32 to conduct. The conduction of Q32 actuates polarity reversal relay RY1 thereby actuating the polarity reversal switch to connect conductor 18 to switch contact 76 and to connect conductor 16 to switch contact 78. This attraction of the polarity reversal switch removes the positive ground from conductor 16 and instead completes a circuit to —24 v. through contact 78 and one of the inputs to an audio transformer T2 and resistances R97 and R104. This actuation of the polarity reversal switch also removes the path of —24 v. through resistance R98 to conductor 18 and instead completes a circuit to ground through contact 76 and the other input to audio transformer T2. The charge on capacitor C42 will maintain Q32 in a state of conduction for the short switching period during which the polarity reversal switch makes the transition from the first to the second position.

Figure 2:
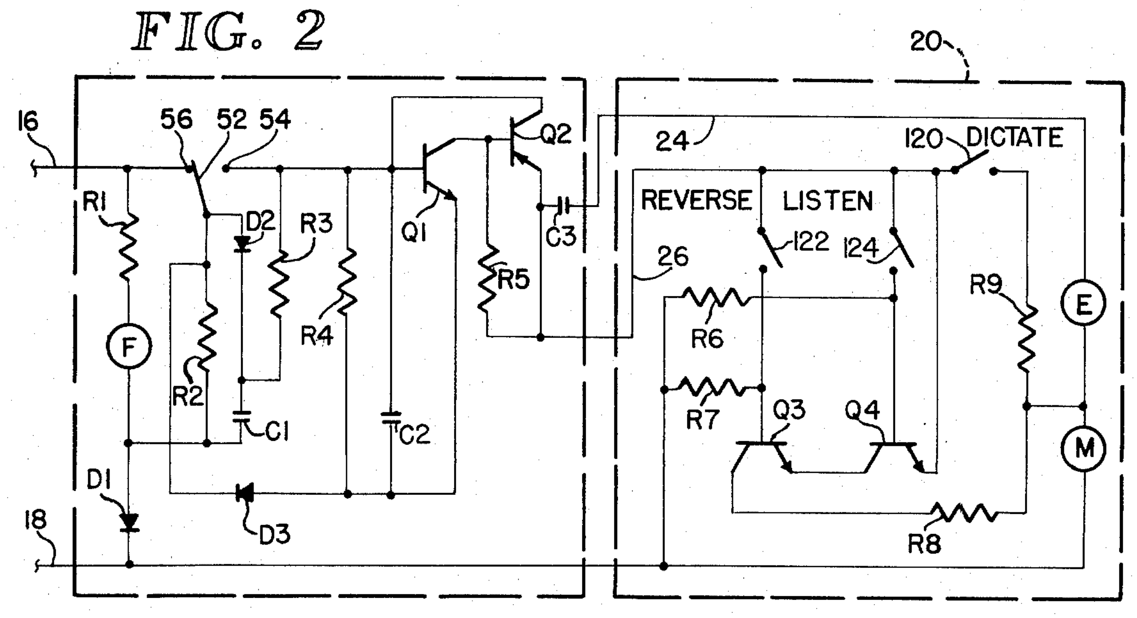
FIG. 2 is a schematic circuit diagram for a portion of the two line dictation control system of FIG. 1 illustrating the dictate station circuit.

With the hook switch 52 (FIG. 2) being switched to contact 56 upon lifting of the handset 20 from base 22 but before polarity reversal has occurred, a capacitance C1 connected in parallel through diode D2 with resistance R2 in the dictate station base circuit is charged to the voltage across resistance R2. When the polarity reversal occurs, diodes D1 and D2 cease to conduct and flag meter F circuit is opened, thereby causing the flag meter to indicate that the recorder has been seized. Polarity reversal places negative voltage on the emitter of Q1 through conductor 16, hook switch contact 56, and diode D3 and the voltage to which capacitor C1 was charged prior to polarity reversal is sufficiently positive to maintain the base of Q1 positive until negative voltage is applied to the emitter of Q1 through D3. Upon the application of negative voltage to the emitter of Q1, Q1 conducts and completes a circuit for the discharge of C1 including R2, D3, the emitter-to-base of Q1 and R3. The conduction of Q1 applies current to the base of Q2 which causes Q2 to conduct and Q1 and Q2 become latched thereby completing a circuit to the dictate station handset 20 through lines 24, 26 and 18. The dictate station is now fully activated and has seized the recorder. The impedance of the parallel circuits in the handset imposes a sufficient load on the recorder to maintain Q32 in a conducting state and the recorder remains seized.

If another dictate station now attempts to seize the recorder, the polarity reversal in the recorder will have occurred previously and the second dictate station's conductor 18 will be grounded and its conductor 16 will be negative. The second dictate station's diode D1 will have ceased to conduct and therefore its flag meter F will have its circuit opened and will indicate that the recorder already has been seized. Diode D2 of the second dictate station will not conduct when its hook switch 52 is switched to contact 56 upon the lifting of its handset 20 from its base 22. The second dictate station's capacitor C1 will not charge upon the switching of hook switch 52 to contact 56 because of the pre-occurrence of the polarity reversal and therefore Q1 will not conduct. Consequently, a circuit between the handset and base of the second dictate station cannot be completed. Without the "pre-conditioning" of capacitor C1 before polarity reversal, the second dictate station cannot complete a circuit to the recorder.

When the handset of the seizing dictate station is placed back on its base, hook switch 52 will be switched back to contact 54 thereby shorting the base-to-emitter path of Q1 through diode D3 and causing Q1 and, hence, Q2 to cease conduction and open the ciricuit to the handset. The return of hook switch 52 to contact 54 takes R2 out of recorder circuit thereby causing Q32 to cease conduction and the relay-operated polarity reversal switch RY1 to return to contacts 72 and 74. Thus, the polarity on conductors 16 and 18 is again reversed and flag meter F conducts once again to indicate that the recorder is not seized.

It is desirable to indicate at the remote dictate station that polarity reversal has been completed and that a recorder has been seized for use. To accomplish this indication, an audio "ready tone" system is employed which is operative in response to the energization of the relay RY1 and completion of the audio and control ciricuit to the handset 20. The audio system constitutes a conventional ready tone circuit or generator 102. The ready tone generator operates in the seize condition to provide a tone across the audio transformer T2 in the audio system of the recorder. This audio tone is passed along the conductors 16 and 18 to an earphone E in the handset 20.

The handset controls the recorder by the selective operation of the dictate, reverse and listen switches 120, 122 and 124 by the buttons 28 and 32 to connect selected resistors R6, R7 and R9 into the circuit and thus change the impedance in the handset circuit so that the load across the lines 16–18 is altered. The impedance changes in the handset will effect corresponding changes at the base of a transistor Q27 in the comparator circuit 40 through conductor 16, switch contact 78 and audio transformer T2. Q27 is an emitter-follower transistor and hence its emitter voltage is essentially that voltage applied to its base. In the preferred circuitry, the handset impedance is selected such that the greatest negative voltage is applied across conductors 16 and 18 in the listen mode, the next highest in the reverse mode, the next in the seize mode, and the lowest in the dictate mode.

The comparator circuit 40 includes transistors Q24, Q25 and Q26 which operate to provide logic control signals at collector outputs 136, 138 and 140. The base circuits of transistors Q24, Q25 and Q26 are connected to the emitter of the transistor Q27 by resistors R85, R87 and R91, respectively. A voltage divider circuit including series resistors R80, R81, R84 and R86 is connected between −24 volts and ground, and controls the potential to the emitters of the transistors Q24, Q25 and Q26. The resistances R80, R81, R84 and R86 in the comparator circuit are matched with the impedances of the dictate station handset such that the voltage at the base of Q27 associated with the listen mode will not actuate any of the voltage divider transistors Q24, Q25 or Q26 and that the reverse mode voltage will actuate Q24, and that the seize voltage will actuate Q24 and Q25, and that the dictate voltage will actuate Q24, Q25 and Q26. Thus, closing of switch 120 in the handset completes the circuit through R9 and the mike M placing the recorder in the dictate mode. Closing of switch 122 in the handset causes Q3 to cease to conduct which removes R8 from the circuit placing the recorder in the reverse mode. Closing of switch 124 in the handset causes Q3 and Q4 to cease to conduct which removes R7 and R8 from the circuit placing the recorder in the listen mode. With switches 120, 122 and 124 open, the circuit is completed through R6, R7 and R8 placing the recorder in the seize mode.

Upon the conduction of Q32 (as a result of the recorder being seized), negative paths are completed to the bases of Q10 and Q11 through resistors R105–R99 and R106–R31, respectively, thereby causing Q10 and Q11 to conduct. In the seize mode, transistors Q24 and Q25 are conducting and complete negative paths to the bases of transistors Q28 and Q29, respectively, thereby causing these latter two transistors to conduct. The conduction of Q28 shunts to ground the negative path through resistance R105 thereby preventing Q10 from conducting which in turn prevents the dictate forward solenoid actuating transistor Q8 from actuating the dictate forward solenoid 61. The conduction of Q29 shunts to ground the negative path through resistance R106 thereby preventing Q11 from conducting which in turn prevents the dictate reverse solenoid actuating transistor Q9 from actuating the dictate reverse solenoid 60. Since transistor Q26 in the comparator circuit is not conducting, the base of transistor Q31 is at ground potential and therefore Q31 is not conducting. Since Q31 is not conducting, the base and emitter of transistor Q20 are both at −24 volts and the base and emitter of transistor Q33 are both at −24 volts and therefore neither Q20 nor Q33 are conducting. Since Q33 is not conducting neither the erase-bias oscillator 64 nor the dictate record amplifier 65 are actuated. Since Q20, Q10 and Q11 are not conducting, the base and emitter of transistor Q34 are both at −24 volts and therefore Q34 is not conducting with the result that the dictate listen amplifier 70 is not actuated.

The conduction of Q32, as a result of the recorder being seized, completes a circuit to the tape capstan motor start relay by transmitting −24 v. through the collector of Q32 path 63 and resistance 38 (FIG. 5) to the base of Q13, causing Q13 to conduct and actuate the motor start relay RY2 to start the motor. As mentioned earlier, the ready tone circuit is on and couples a tone through the audio transformer T2 to the dictate station.

In the dictate mode, transistors Q24, Q25 and Q26 are conducting. Q26 completes a negative path to the base of transistor Q31 through R102 thereby causing Q31 to conduct through R101. The conduction of Q31 completes a ground path through the base-to-emitter of Q10 and R101 to the bases of transistors Q20 and Q33 through R56 and R77, respectively, causing Q20 and Q33 to conduct. Q24 and Q25 complete negative paths to the bases of transistors Q28 and Q29 as described above. The conduction of Q29 results in the prevention of the actuation of the dictate reverse solenoid, as described above. The conduction of Q28, however, and the completion therethrough of a path to ground does not result in the prevention of the actuation of the dictate forward solenoid, as described above, because the conduction of Q31 completes a negative path to the base of Q10 through the emitter-to-base of Q20 and Q33, R65, R77 and R101 thereby causing Q10 to conduct. The conduction of Q10 through R26 to ground completes a ground path to the base of the dictate forward solenoid actuating transistor Q8 through R26 thereby causing Q8 to conduct and actuate the dictate forward solenoid. The conduction of Q8 also deactivates the ready tone circuit 102 by completing a negative path to the base of Q21 through R25 thereby causing Q21 to saturate and cease functioning as an oscillator. The conduction of Q10 normally would complete a ground path through R108 to the base of Q34 causing Q34 to conduct. However, the conduction of Q20 shunts the ground path through R108 to −24 v. thereby preventing Q34 from conducting and preventing the actuation of the dictate listen amplifier 70. The conduction of Q33 completes a circuit to the erase bias oscillator 64 and the dictate record amplifier 65 thereby actuating them. Audio from the dictate station is coupled to the actuated dictate record amplifier 65 through the audio transformer T2 and from the amplifier 65 to the dictate record head 66 through path 68. Diodes D9 and D10 and resistor R29 providing a limiting network to insure that audio peaks do not actuate any of the transistor switching circuits.

In the reverse mode, transistor Q24 is conducting and completes a negative path to the base of Q28 thereby causing Q28 to conduct. The conduction of Q28 results in the prevention of the actuation of the dictate forward solenoid, as described above. Since Q25 is not conducting, Q29 does not conduct and thereby permits the completion of a negative path from Q32, R106 and R31 to the base of Q11, causing Q11 to conduct. The conduction of Q11 completes a ground path to the base of the dictate reverse solenoid actuating transistor Q9 through R33 thereby causing Q9 to conduct and actuate the dictate reverse solenoid. The conduction of Q9 also deactuates the ready tone circuit 102 by completing a negative path to the base of Q21 through R24 thereby causing Q21 to saturate and cease functioning as an oscillator. The conduction of Q11 also actuates the dictate listen amplifier 70 by completing a ground path to the base of Q34 through R107 thereby causing Q34 to conduct −24 volts to the listen amplifier. Since Q26 is not conducting Q31, Q20 and Q33 do not conduct, as described above, and therefore the erase bias oscillator 64 and the dictate record amplifier 65 are not actuated. Audio from the plyaback head 66 is coupled through path 68 and capacitor C22 to the listen amplifier 70 and through audio transformer T2 to the dictate station.

In the listen mode, none of the comparator transistors Q24, Q25 and Q26 are conducting. Since Q24 is not conducting, Q28 does not conduct and a negative path to the base of Q10 is completed through Q32, R105 and R99 thereby causing Q10 and Q8 to conduct to actuate the dictate forward solenoid 61, as described above. Although Q25 is not conducting, Q29 does conduct since a negative path is completed to its base through Q32, R105 and R93 thereby preventing the actuation of the dictate reverse solenoid 60 as described above. The conduction of Q8 reactuates the ready tone circuit 102 as described above. The conduction of Q10 also completes a positive path to the base of Q34 through R108 thereby causing Q34 to conduct and actuate the dictate listen amplifier 70. Since Q26 is not conducting, Q31 Q20 and Q33 do not conduct, as described above, and therefore erase bias oscillator 64 and the dictate record amplifier 65 are not actuated. Audio from the playback head 66 is coupled through path 68 and C22 to amplifier 70 and through audio transformer T2 to the dictate station.

In switching from one operative mode to another, the control circuit will at least momentarily return to the seize mode. The present circuit provides the seize control voltage, in which all dictate recording and playback functions are rendered inoperative, between the dictate control voltage and the reverse and listen control voltages. The reason for this is that energization of the transistors up or down in the voltage comparator always requires stepping through intermediate voltages corresponding to functions which will be instantaneously triggered particularly when the circuit response is slowed. Since the audio circuit and the control circuits are connected to the conductors 16 and 18 the capacitive coupling and inherent reactance in the circuits will slow the rate of response. Thus in going from dictate to reverse or vice versa the voltage comparator will actually sense an instantaneous seize signal but in such event neither the dictate forward nor dictate reverse solenoids will be energized. The physical operation of switching from reverse to listen is often sufficiently rapid that the comparator voltage will likely step up without first reverting to the seize voltage level and therefore the inherent slow rate of response will not be troublesome. In going from listen to dictate, the voltage comparator will instantaneously receive a reverse signal that may trigger momentary actuation of the reverse solenoid. The particular arrangement provided, however, will minimize this momentary triggering of the recorder circuits during change from one operative mode to the other. Thus, the dictate reverse solenoid will not remain actuated long enough to move tape. Since in normal useage the dictate reverse solenoid is usually actuated much less than the dictate forward solenoid, the relative increased wear on the dictate reverse solenoid, as a result of this momentary triggering will not be substantial. The relative voltage operating sequence of the various modes may be changed if desired, which will of course necessitate an alteration of the control logic circuits.

The number of remote dictate stations which can be connected to a recorder control system similar to that heretofore described is limited due to the amount of current drawn by the indicators F in the remote stations. If too many remote stations are connected in parallel to one recorder, the control circuitry in the recorder will be unable to distinguish between the total amount of current drawn by the unseized dictate stations and the current drawn by a dictate station attempting to seize the recorder. To alleviate this situation, when the recorder is in the standby position but not seized, an alternating current or voltage may be imposed from a separate source across the conductors 16 and 18 so that these conductors are alternately positive and negative. The indicating circuit including the resistor R1 and the indicator F in any remote station connected across the conductors 16 and 18 may be placed in series with a diode in such a manner that during one half of the alternating current cycle, the indicator F indicates as if a direct current were supplied to the meter. Current drawn on this half of the alternating current cycle does not result in the seizing of the recorder, but the seizing diode D2 in the remote station may be connected in such a manner that it will cause current to flow during the remaining half cycle if the remote station indicates that the recorder is to be seized. The polarity control section 38 in the recorder is then adjusted to recognize this change in current or voltage developed across the conductors 16 and 18 so that the recording units seized. Upon seizure of the recorder, the voltage on the conductors 16 and 18 becomes a direct current voltage in the manner previously described.

Figure 3:
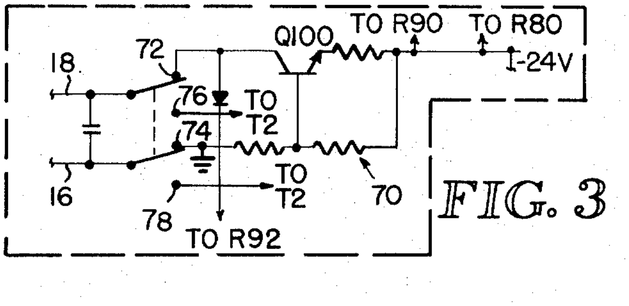
FIG. 3 is a modification showing a recorder-transcriber circuit which will accommodate several additional dictate stations coupled to the recorder-transcriber.

A second alternative is shown in FIG. 3 in which a constant current generator 70 is substituted for R98 in the preferred embodiment to provide whatever current is demanded by the plurality of unseized, parallel-wired dictate stations. In this alternative, the constant current generator is designed to supply this added demand but not to supply the current required when one of the dictate stations attempts to seize the recorder. In this latter instance a current demand will be placed on the parallel path including R92, R96 and R104, such that Q32 will be placed in its state of conduction.

If the endless tape loop becomes taut between the dictate forward tape drive and the transcribe forward tape drive (as a result of the transcriber catching up to the dictator or as a result of the dictator reversing his dictation), the tautness of the tape will open a switch 73 thereby removing −24 v. from the emitter of Q9 to prevent the dictator from actuating the dictate reverse solenoid 60. If the endless tape loop becomes taut between the dictate reverse tape drive and the transcribe reverse tape drive as a result of the dictator using up the length of transcribed tape available for dictation or as a result of the transcriber reversing the transcribed tape, the tautness of the tape will open a switch 75 thereby removing −24 v. from the emitter of Q8 to prevent the dictator from actuating the dictate forward solenoid 61.

Figure 5:
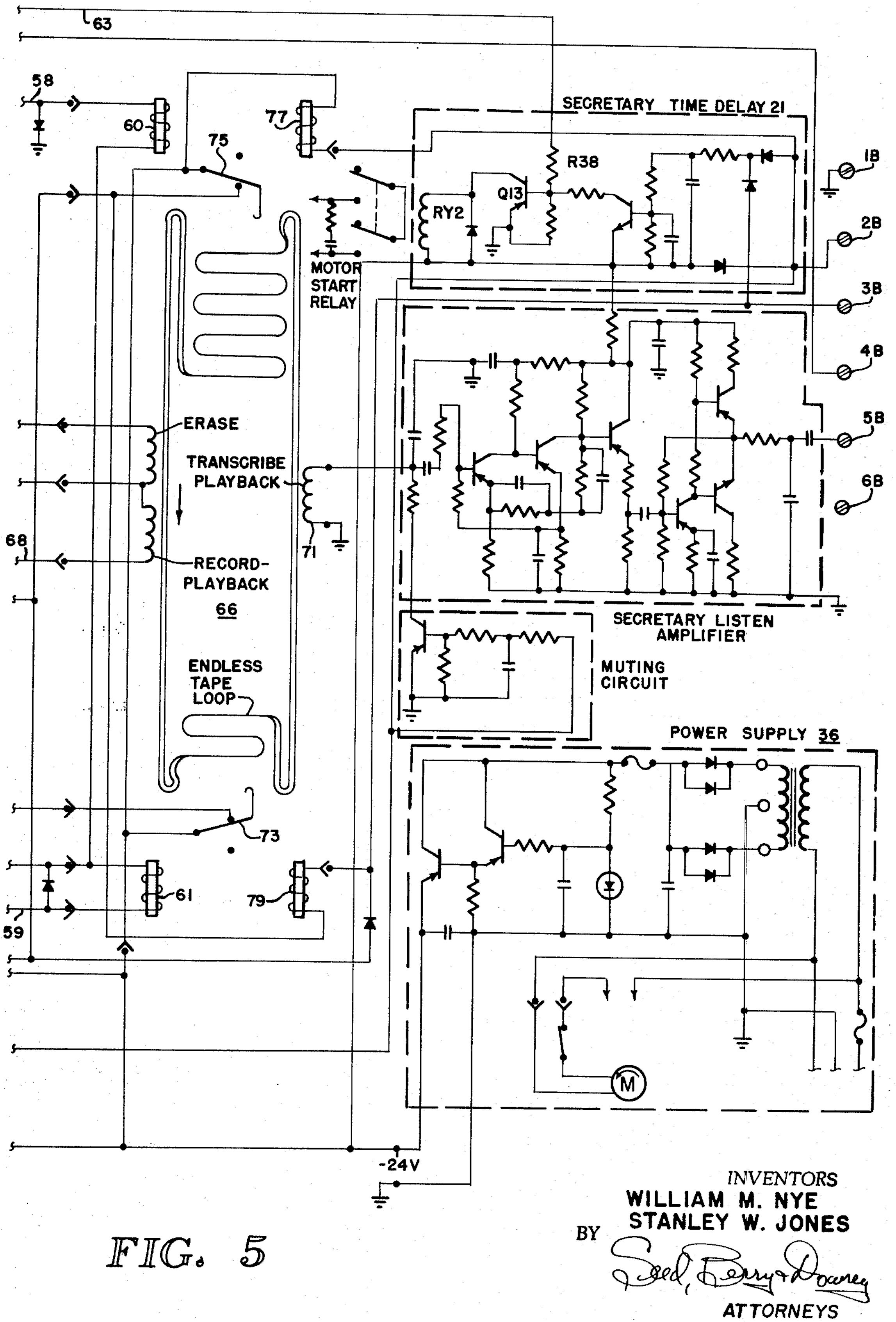
Figure 6:
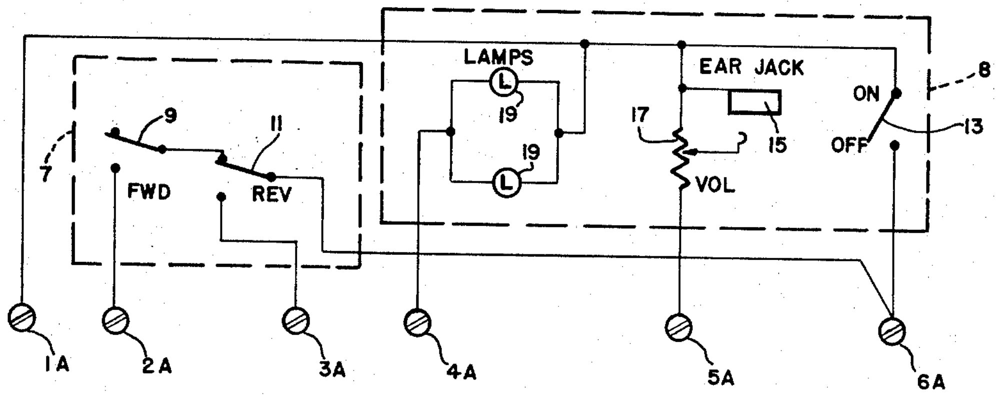

Turning now to FIGS. 5 and 6, the usual remote transcribe station comprises a foot switch unit 7 and desk unit 8. The foot switch unit comprises a transcribe forward switch 9 and a transcribe reverse switch 11. The desk unit comprises an on-off switch 13, and ear jack 15, a volume control 17 and indicator lamps 19. The transcribe station is connected to the recorder-transcriber through six terminals: 1A to 1B, 2A to 2B, 3A to 3B, 4A to 4B, 5A to 5B and 6A to 6B. In the transcribe section of the recorder-transcriber, −24 v. is applied through tape switches 73 and 75 through the transcribe forward solenoid 77 to terminal 2B and through the reverse solenoid 79 to terminal 3B. Thus, the transcribe listen amplifier 81 is turned on and coupled to the desk unit ear jack 15 through terminals 5B and 5A. With the desk unit on-off switch 13 in the "on" position, a circuit is completed from terminal 6A to terminal 1A to terminal 1B to ground. When the transcribe forward foot switch 9 is closed, a path to ground is completed from the transcribe forward solenoid 77 through terminal 2B, terminal 2A, terminal 6A and terminal 1A, thereby actuating the transcribe forward solenoid 77. Closure of the transcribe forward foot switch 9 also energizes a time delay circuit 21 that will actuate the motor start relay RY2 to start the tape drive motor and maintain RY2 actuated for a sufficiently long period (i.e. on the order of a few minutes) such that momentary opening of the transcribe forward foot switch 9, because of alternate use of foot switches 9 and 11, will not result in the tape drive motor turning off. (Of course, the tape drive motor will remain on so long as the recorder-transcriber is seized by a dictate station regardless of whether there is any transcribe activity.) When the transcribe reverse foot switch 11 is closed, a path to ground is completed from the transcribe reverse solenoid 79 through terminal 3B, terminal 3A, terminal 6A and terminal 1A, thereby actuating the transcribe reverse solenoid 79. Whenever there is dictated-upon-but-untranscribed tape, tape switch 73 will be closed thereby providing −24 v. through terminal 4B and terminal 4A to turn on the indicator lamps 19. When the transcribe forward foot switch 9 is closed, the recorder-transcriber thus being in the transcribe mode, and the tape loop becomes taut between the dictate forward and transcribe forward tape drives, tape switch 73 will be opened and the desk unit lamps 19 will be turned off signifying the approach of the end of the recorded material. At this point, the section of recorded-upon tape between the dictate forward drive and the transcribe forward drive could not be transcribed unless the dictate forward drive is actuated to move tape simultaneously with the transcribe forward drive. When the tape switch 73 opens, −24 v. is no longer supplied through R29 to the base of Q30 (FIG. 4) and instead, whenever transcribe forward foot switch 9 is closed, a ground path is completed to the base of Q30 through R34 and terminals 2B, 2A, foot switches 9 and 11, terminal 6A, on-off switch 13 and terminals 1A and 1B. Thus, the normally conducting Q30 ceases to conduct and permits the supply of −24 v. through R24 and R100 to the base of Q10 thereby causing Q10 and Q8 to conduct to actuate the dictate forward solenoid 61 concurrently with the actuation of transcribe forward solenoid 79. When tape switch 73 is closed, the supply of −24 v. therethrough to the base of Q30 causes Q30 to conduct and shunt the supply of −24 v. from the base of Q10 through R24 to ground.

The embodiments of the invention in which an exclusive property or privilege is claimed are defined as follows:

1. In a dictation system including a recorder-transcriber unit having a plurality of operational modes and at least one remote dictating station, the improvement comprising two conductors connected between said recorder-transcriber unit and said dictating station to provide both a control connection and a bidirectional audio connection therebetween and two wire dictation control means for facilitating both the control of said recorder-transcriber unit and the transmission of audio signals by means of said two conductors, said two wire dictation control means including control means in said remote dictating station operative over said two conductors to initiate the seizure of a free recorder-transcriber unit and to enable the subsequent control of recorder-transcriber operational modes, and control responsive means in said recorder-transcriber unit activated by said control means to complete the seizure of said recorder-transcriber unit and the subsequent control thereof; said control responsive means including polarity reversing means operative to maintain a first polarity relationship between said conductors before seizure of said recorder-transcriber unit, said polarity reversing means operative in response to the initiation of seizure by said control means to reverse said first polarity relationship to provide a second, opposite polarity relationship between said conductors.

2. The combination of claim 1 wherein said polarity reversing means is connected to a source of D.C. power, said polarity reversing means including a double-pole double-throw switch means connected to said two conductors to reverse the polarity thereof, a solenoid coil for actuating said double-pole double-throw switch means, and a semiconductor means for energizing said solenoid coil upon the initiation of seizure by said control means.

3. The combination of claim 1 including audio transmission means providing an audio signal balanced equally over said two lines.

4. The combination of claim 1 wherein said control means includes seizure circuit means operative in response to the presence of said first polarity relationship between said two conductors to provide a seizure command signal to initiate the operation of said polarity reversing means, said seizure circuit means including resistive circuit means connected across said two conductors and operative to pass a signal of an amplitude less than that required to initiate the operation of said polarity reversal means, command circuit means operable when connected to said two conductors to pass said seizure command signal, switch means for connecting said command circuit means across said resistive circuit means, and blocking means for preventing current flow through said resistive circuit means and command circuit means upon the establishment of said second polarity relationship.

5. The combination of claim 4 wherein said resistive circuit means includes meter means operative to provide an indication upon the flow of current therethrough.

6. The combination of claim 1 wherein said control means includes a control resistance circuit having a plurality of selectively operable paths, each such path having a resistance value which differs from that of each remaining path, and mode switching means for selectively connecting each such path to vary the load across said two conductors, said control responsive means including comparator means responsive to the connection of each path by said mode switching means to provide a different output signal in response to each path connection.

7. The combination of claim 6 wherein said comparator means includes a voltage divider having a plurality of output circuits, a transistor switching means in each of said voltage divider output circuits to control the provision of an output signal by said output circuit, and transistor control means connected between said transistor switching means and one of said two conductors to transmit a triggering voltage to selected transistor switching means determined by the load variation across said two conductors.

8. The combination of claim 6 wherein said control means includes logic circuit means connected to receive the output signals from said comparator means, said logic circuit means operating in response to said output signals to provide an activating signal to energize the recorder-transcriber in selective operational modes.

9. The combination of claim 6 wherein said recorder-transcriber unit operation modes include seize, dictate, listen and reverse, said paths include resistance values corresponding to said operational modes, and wherein said resistance value corresponding to said seize mode is between the resistance values of two other of said modes.

10. The combination of claim 9 wherein said two other modes include dictate and listen.

11. In a dictation system including a recorder-transcriber unit having a plurality of operational modes and at least one remote dictating station, the improvement comprising two conductors connected between said recorder-transcriber unit and said dictating station to provide both a control connection and a bidirectional audio connection therebetween and two wire dictation control means for facilitating both the control of said recorder-transcriber unit and the transmission of audio signals by means of said two conductors, said two wire dictation control means including control means in said remote dictating station operative over said two conductors to initiate the seizure of a free recorder-transcriber unit and to enable the subsequent control of recorder-transcriber operational modes, and control responsive means in said recorder-transcriber unit activated by said control means to complete the seizure of said recorder-transcriber unit and the subsequent contol thereof; each said remote dictating station including an electrically connected base and handset, said control means including a combined audio and control circuit connected across said two conductors and extending through said base and handset and solid state switching means in said combined audio and control circuit and operative to block said circuit until the seizure of a free recorder-transcriber unit by said control means.

12. The combination of claim 11 wherein said control means includes seizure control means operative to provide a seizure command signal to said control responsive means to initiate seizure of a free recorder-transcriber unit, said seizure control means additionally operating to provide a gating signal to said solid state switching means to cause said switching means to complete said audio and control circuit.

13. The combination of claim 12 wherein said control responsive means includes polarity reversing means for maintaining a first polarity relationship between said two conductors before seizure of said recorder and transcriber and for reversing said first polarity relationship to provide a second, opposite polarity relationship upon receipt of said seizure command signal.

14. The combination of claim 13 wherein said control responsive means includes an audio ready tone generator means operative upon the operation of said polarity reversing means in response to said seizure command signal to provide an audio tone over said two conductors.

15. A dictation system including a recorder-transcriber unit and a separate dictate station interconnected with the recorder-transcriber unit through two electrical conductors, comprising:

control means in said dictate station and selectively connected to the two electrical conductors to present a first electrical condition to the two conductors when operated to remove said dictate station from use and to present a second electrical condition to the two conductors when operated to place said dictate station in use;

control signal means in said recorder-transcriber unit operative to maintain across the two conductors a signal of a first polarity when said control means is in said first electrical condition; and said recorder-transcriber unit including control responsive means connected to said two conductors and responsive to said control means assuming said second electrical condition to cause said control signal means to place across said two conductors a signal of second polarity the reverse of said first polarity to effect seizure of said recorder-transcriber unit by said dictate station.

16. Apparatus as in claim 15, wherein said dictate station control means includes polarity responsive means connected to said two conductors and operative in response to the presence across the two conductors of said second polarity signal at the time said control means is operated to place said dictate station in use to render said dictate station incapable of effecting seizure of said recorder-transcriber unit at said time.

17. A dictation system including a recorder-transcriber unit and a separate dictate station interconnected with the recorder-transcriber unit through two electrical conductors, comprising:

control means in said dictate station and operatively associated with the two electrical conductors to present a first electrical condition to the two conductors when operated to remove said dictate station from use and to present a second electrical condition to the two conductors when operated to place said dictate station in use;

control signal means in said recorder-transcriber unit operative to maintain across the two conductors a signal of a first polarity when said control means is in said first electrical condition;

said recorder-transcriber unit including control responsive means operatively associated with the two conductors and responsive to said control means assuming said second electrical condition to cause said control signal means to place across the two conductors a signal of second polarity the reverse of said first polarity to effect seizure of said recorder-transcriber unit by said dictate station;

said control means in said dictate station including a control resistance circuit having a plurality of selectively operable paths, each such path having a resistance value which differs from that of each remaining path;

mode switching means in said control means and operable for selectively connecting each such path to vary the resistive load across the two conductors; and said control responsive means including comparator means connected to be responsive to said resistive load connected across the two conductors and operative to provide a different output signal in response to each such load.

18. A dictation system including a recorder-transcriber unit and a separate dictate station interconnected with the recorder-transcriber unit through two electrical conductors, comprising:

control means in said dictate station and operatively associated with the two electrical conductors to present a first electrical condition to the two conductors when operated to remove said dictate station from use and to present a second electrical condition to the two conductors when operated to place said dictate station in use;

control signal means in said recorder-transcriber unit operative to maintain across the two conductors a signal of a first polarity when said control means is in said first electrical condition; and said recorder-transcriber unit including control responsive means operatively associated with the two conductors and responsive to said control means assuming said second electrical condition to cause said control signal means to place across the two conductors a signal of second polarity the reverse of said first polarity to effect seizure of said recorder-transcriber unit by said dictate station;

first audio communication means in said dictate station and operatively associated with the two conductors to establish audio signal communication with said recorder-transcriber unit along the two conductors; and second audio communication means in said recorder-transcriber unit and operatively associated with the two conductors to complete establishment of audio signal communication between said dictate station and said recorder-transcriber unit along the two conductors.

References Cited

UNITED STATES PATENTS

| | | | |
|---|---|---|---|
| 2,979,568 | 4/1961 | Logan | 179—100.1 DR |
| 3,527,891 | 9/1970 | Johnston | 179—2 A |
| 3,418,432 | 12/1968 | Boggs et al. | 179—100.1 DR |

FOREIGN PATENTS

| | | | |
|---|---|---|---|
| 1,173,145 | 6/1964 | Germany | 179—100.1 DR |

OTHER REFERENCES

Boggs, Remote Dictating Selecting Circuit, IBM Tech. Disclosure Bulletin, March 1965, pp. 871–2.

RAYMOND F. CARDILLO Jr., Primary Examiner

U.S. Cl. X.R.

179—6 E